US012542367B2

(12) United States Patent
Gibilaro et al.

(10) Patent No.: US 12,542,367 B2
(45) Date of Patent: Feb. 3, 2026

(54) MULTIMODE FEED FOR REFLECTOR ANTENNA OF A MONOPULSE TRACKING SYSTEM

(71) Applicant: LEONARDO S.P.A., Rome (IT)

(72) Inventors: Giorgio Gibilaro, Pomezia (IT); Tindaro Cadili, Pomezia (IT); Anna Genovese, Pomezia (IT); Liborio Gianino, Pomezia (IT); Agatino Privitera, Pomezia (IT); Fabrizio Tosto, Pomezia (IT); Vincenzo Cascio, Pomezia (IT)

(73) Assignee: LEONARDO S.P.A., Rome (IT)

( * ) Notice: Subject to any disclaimer, the term of this patent is extended or adjusted under 35 U.S.C. 154(b) by 0 days.

(21) Appl. No.: 18/566,937

(22) PCT Filed: Dec. 12, 2022

(86) PCT No.: PCT/IB2022/062078

§ 371 (c)(1),
(2) Date: Dec. 4, 2023

(87) PCT Pub. No.: WO2023/111818

PCT Pub. Date: Jun. 22, 2023

(65) Prior Publication Data

US 2024/0283160 A1 Aug. 22, 2024

(30) Foreign Application Priority Data

Dec. 15, 2021 (EP) .................................... 21425065
Apr. 28, 2022 (IT) ........................ 102022000008513

(51) Int. Cl.
*H01Q 13/02* (2006.01)
*H01Q 5/55* (2015.01)

(52) U.S. Cl.
CPC ............. *H01Q 13/025* (2013.01); *H01Q 5/55* (2015.01)

(58) Field of Classification Search
CPC ...... H01Q 5/55; H01Q 1/288; H01Q 13/0283; H01Q 13/00; H01Q 13/025; H01Q 25/02;
(Continued)

(56) References Cited

FOREIGN PATENT DOCUMENTS

CA 840591 A 4/1970
GB 2137428 A * 10/1984 ................ H01P 1/16
(Continued)

OTHER PUBLICATIONS

KR 18566937 Translation (Year: 2017).*
(Continued)

*Primary Examiner* — Dameon E Levi
*Assistant Examiner* — Gurbir Singh
(74) *Attorney, Agent, or Firm* — Ballard Spahr LLP

(57) ABSTRACT

The invention concerns a multimode feed for a reflector antenna of a monopulse tracking system. The feed comprises: a receiving element having an aperture, which receives an electromagnetic wave and generates, from the electromagnetic wave, a waveguide signal comprising a plurality of higher-order modes, as a function of an incidence angle of the electromagnetic wave on the aperture; and a waveguide structure, coupled to the receiving element, which generates, from the plurality of higher-order modes,
(Continued)

a first error signal at a first output port and a second error signal at a second output port. The waveguide structure has: a first coupler that extracts, from the waveguide signal, a first higher-order mode and provides a first extracted signal; a second coupler that extracts, from the waveguide signal, a second higher-order mode and provides a second extracted signal; a third coupler that extracts, from the waveguide signal, a third higher-order mode and provides a third extracted signal; a fourth coupler that extracts, from the waveguide signal, a fourth higher-order mode and provides a fourth extracted signal; a first summing element that sums the first extracted signal and the second extracted signal, thereby generating the first error signal at the first output port; and a second summing element that sums the third extracted signal and the fourth extracted signal, thereby generating the second error signal at the second output port.

9 Claims, 5 Drawing Sheets

(58) Field of Classification Search
CPC .... H01Q 13/02; H01Q 13/0208; H01Q 25/04; H01Q 13/0258; H01Q 19/132; H01Q 13/06; H01Q 13/03; H01Q 13/04; H01Q 13/05; H01Q 15/155; H01P 1/16
See application file for complete search history.

(56) References Cited

FOREIGN PATENT DOCUMENTS

| | | | | | |
|---|---|---|---|---|---|
| KR | 20080104766 | A | | 12/2008 | |
| KR | 1805722 | B1 | * | 12/2017 | .............. H01P 3/127 |
| KR | 101805722 | B1 | * | 12/2017 | ............. H01Q 25/02 |
| KR | 101805723 | B1 | | 12/2017 | |

OTHER PUBLICATIONS

KR-101805722-B1 (Year: 2017).*
Anil Kumar Pandey, Design of Multi-mode Tracking System for Earth Station Antenna, Dec. 9, 2016, EEsof, Keysight Technologies, Manesar, India, Proceedings of the Asia-Pacific Microwave Conference 2016 (Year: 2016).*
International Preliminary Report on Patentability for International Application No. PCT/IB2022/062078 mailed Aug. 7, 2023.
International Search Report and Written Opinion from International Application No. PCT/IB2022/062078 mailed Mar. 13, 2023.
PCT Direct Letter for International Application No. PCT/IB2022/062078 filed Jan. 26, 2023.
PCT Notification of Receipt of Demand for International Application No. PCT/IB2022/062078 mailed Jul. 7, 2023.
Reply to Written Opinion for International Application No. PCT/IB2022/062078 filed Jun. 30, 2023.
Pandey, "Design of Multimode Tracking System for Earth Station Antenna", Proceedings of the Asia-Pacific Microwave Conference, 2016, 4 pages.

* cited by examiner

MULTIMODE FEED FOR REFLECTOR ANTENNA OF A MONOPULSE TRACKING SYSTEM

CROSS-REFERENCE TO RELATED APPLICATIONS

This Patent application is a U.S. national stage of PCT International Application No. PCT/IB2022/062078 filed on Dec. 12, 2022, which claims priority from European Patent Application No. 21425065.6 filed on Dec. 15, 2021 and from Italian Patent Application No. 102022000008513 filed on Apr. 28, 2022 the entire disclosure of each of which is incorporated herein by reference.

Technical Sector of the Invention

The present invention relates to a multimode feed for a reflector antenna of a monopulse tracking system. The present invention finds advantageous but not exclusive application in radar and aerospace field, in particular in satellite applications.

State of the Art

Monopulse tracking systems for radar and satellite applications are known and are configured to determine the position of an object, such as a satellite or an aircraft, with respect to a reflector antenna.

The reflector antenna comprises a reflector, e.g. an in-axis, off-axis parabolic disc or one with a more complex configuration, e.g. Cassegrain, and a feed or power supply configured to receive an electromagnetic wave reflected from the reflector, for example from the object to be tracked, and transmit a transmission electromagnetic wave on the reflector.

In monopulse tracking systems, it is known to design the reflector antenna so that the reflector is divided into four quadrants and the feed is formed by an array of feeds which is in turn divided into four sub-arrays of feeds, each illuminating a respective quadrant of the reflector.

In reception, when an electromagnetic wave hits the reflector, it is reflected onto the array of feeds. Each sub-array of feeds generates a respective signal indicative of the portion of electromagnetic wave received.

By combining together the signals generated by the sub-arrays of feeds, it is known to determine an azimuth error and an elevation error of the pointing of the reflector antenna with respect to the object to be tracked. Then, the position of the reflector antenna can be corrected to improve the pointing of the reflector antenna.

However, such an array approach has disadvantages. In fact, the array of feeds requires a complex design and has high costs and dimensions.

In detail, it is complex to design an array of feeds capable of ensuring an efficient illumination of the reflector and at the same time ensuring both a high antenna gain and a high slope of the tracking pattern (i.e. the ability of the antenna to detect and therefore correct a pointing error).

Such disadvantages are particularly problematic when the reflector is small in size or the optics of the reflector comprise multiple reflectors including a sub-reflector having small dimensions.

In addition, antennas based on an array of feeds suffer from inaccurate pointing of the antenna at an object to be tracked. In fact, the pointing of the feed array depends on the phase signal generated by each feed of the feed array. This phase depends on the length of the electrical path of the individual feed. Small phase differences, especially as the frequency used increases, can therefore cause high pointing errors, resulting in a decrease in antenna performance.

According to an alternative approach, it is known to realize a reflector antenna for a monopulse tracking system having an operation based on the higher propagation modes of a wave within a waveguide. In such systems, the reflector antenna comprises only one feed, of the multimode type, formed by a horn having an aperture that receives an electromagnetic wave and generates higher-order propagation modes within it, as a function of the orientation between the direction of propagation of the wave and the aperture of the horn.

The amplitude of the higher-order modes decreases if the incident wave becomes parallel to the aperture of the horn.

Known multimode feeds typically use only one higher-order propagation mode to obtain the azimuth and elevation error signals.

For example, multimode feeds made with circular waveguides using only the higher-order mode $TM_{01}$ or $TE_{21}$ to determine azimuth and elevation errors are known. Known multimode feeds suffer from a low level of the azimuth and elevation error signals.

Aim and Summary of the Invention

Aim of the present invention is to overcome the disadvantages of the prior art.

According to the present invention, there are thus provided a multimode feed and a reflector antenna as defined in the appended claims.

BRIEF DESCRIPTION OF THE DRAWINGS

For a better understanding of the present invention, a preferred embodiment is now described, by way of non-limiting example only, with reference to the accompanying drawings, in which.

DETAILED DESCRIPTION OF PREFERRED EMBODIMENTS OF THE INVENTION

The following description is provided to enable a person skilled in the art to use and implement the invention. Various modifications to the embodiments will be apparent to those skilled in the art, without departing from the scope of protection of the claimed invention. Consequently, the present invention is not intended to be limited to the embodiments shown, but the widest protection scope is to be accorded consistently with the principles and features described below and defined in the appended claims.

Unless otherwise specified, all scientific and technical terms used below have the same meaning as commonly understood by a person skilled in the ordinary art. In the event of any conflict, this description, including the definitions provided, shall be binding. In addition, the examples are illustrative only and are not intended to be limiting.

The terminology used below is intended to describe particular embodiments and is not to be construed as limiting the purpose of the present disclosure.

Figure 1:
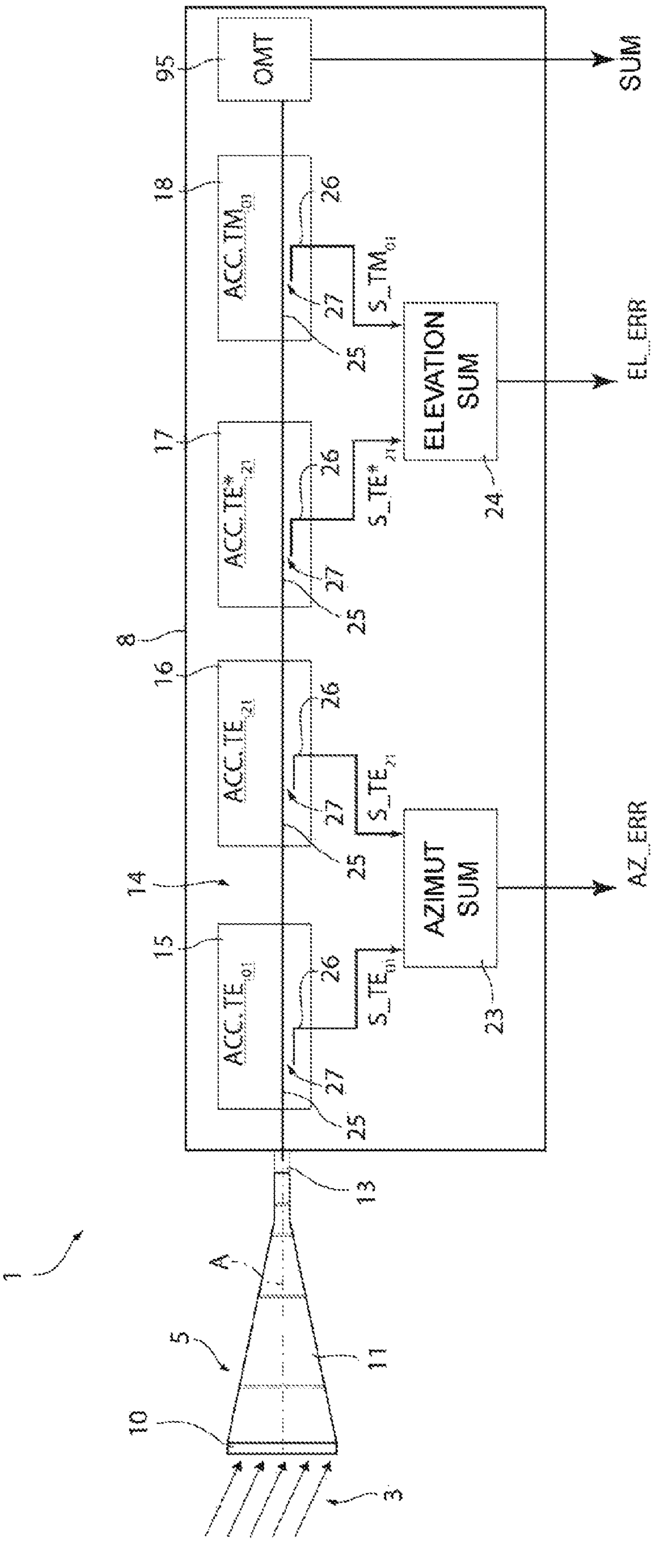
FIG. 1 shows a block diagram of a feed of a reflector antenna, according to an embodiment of the present invention.
Figure 2:
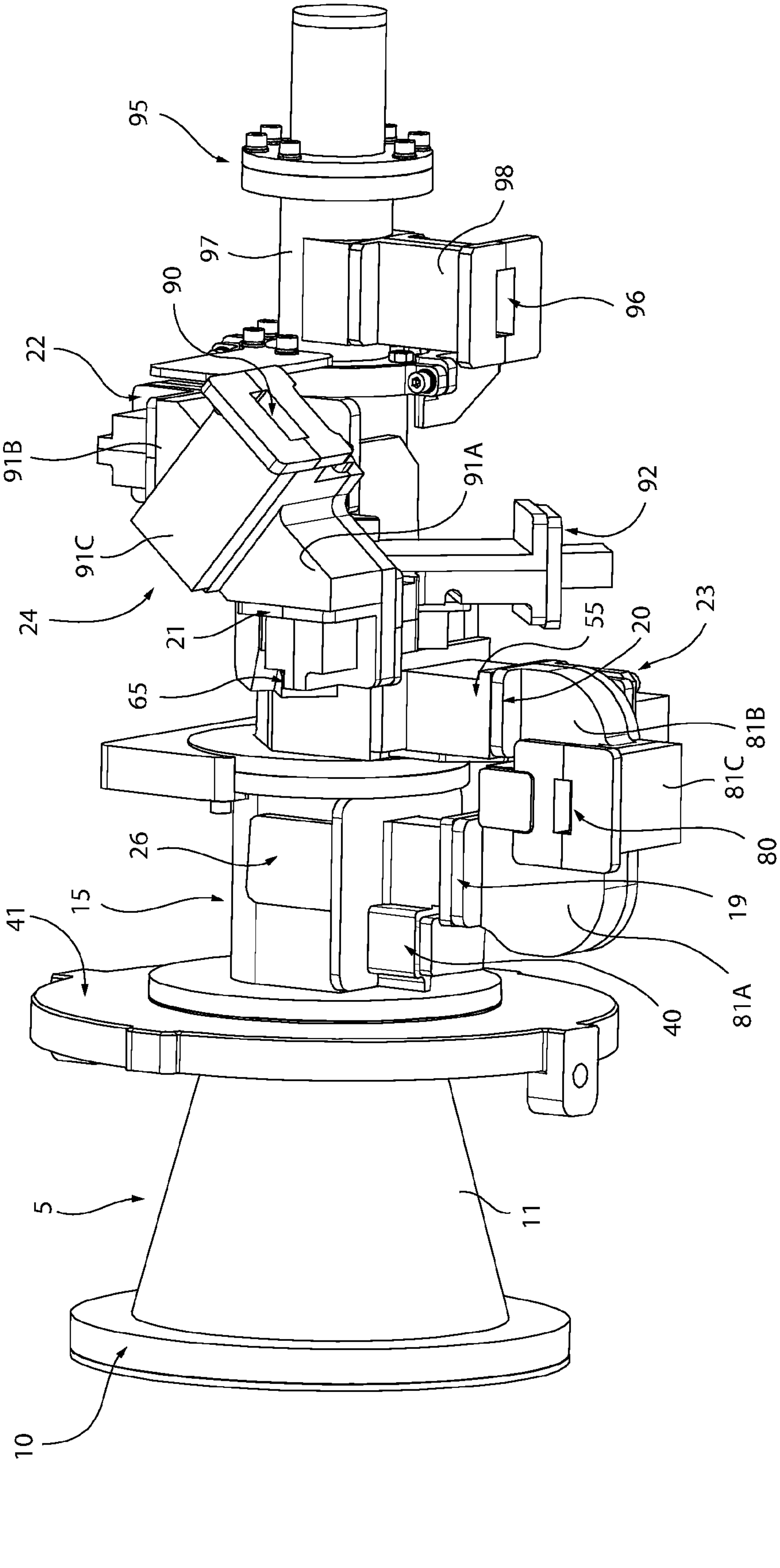
FIG. 2 shows a perspective view of the feed of FIG. 1, from a first side.
Figure 3:
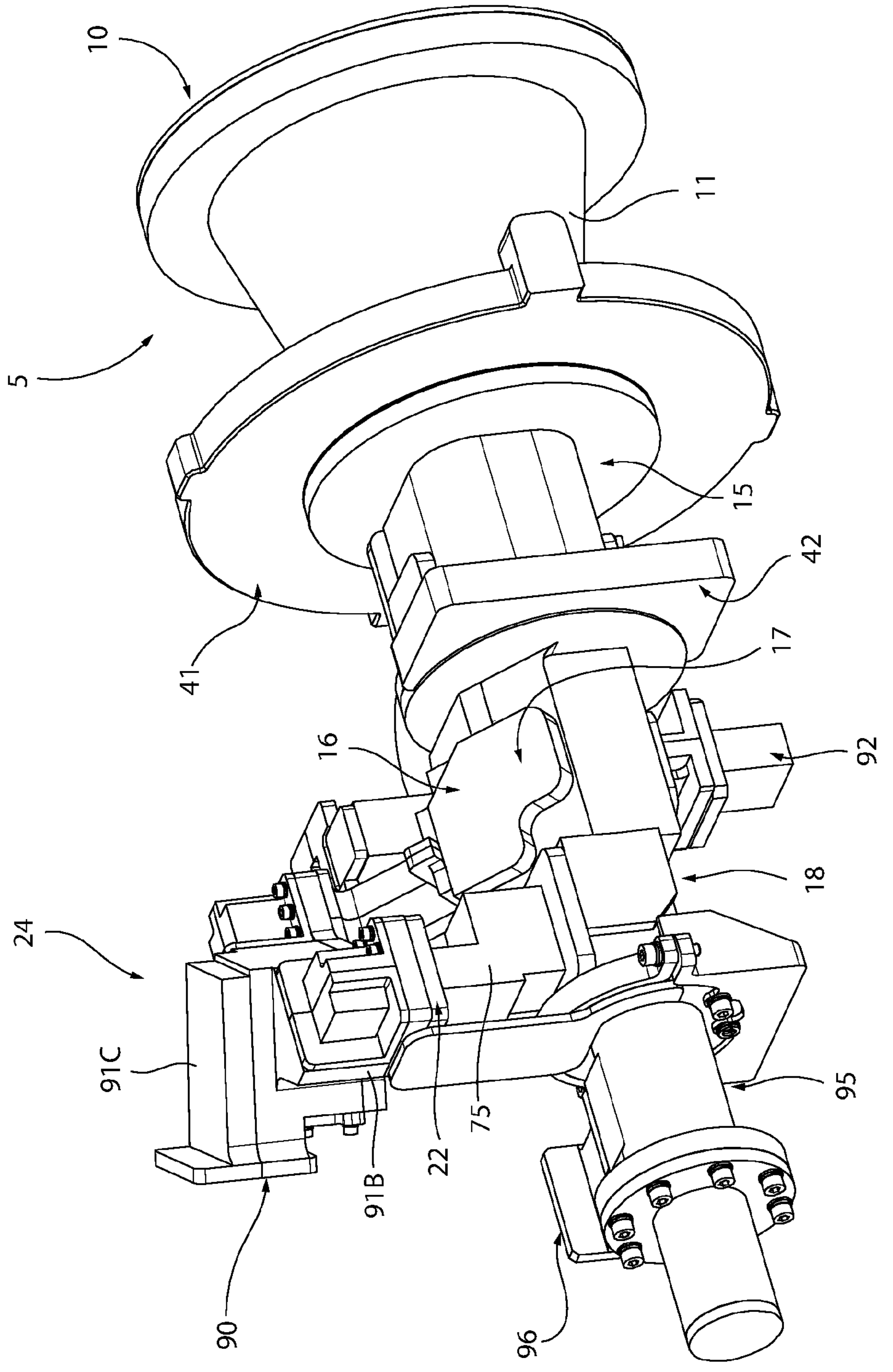
FIG. 3 shows a perspective view of the feed of FIG. 1, from a second side opposite the first side.

FIGS. 1-3 show a feed, hereinafter referred to as a feed, 1 of a reflector antenna, which can be used in a monopulse tracking system.

The reflector antenna comprises a reflector, not shown here, coupled to the feed 1; for example, the reflector can be parabolic, for example of the Cassegrain or Gregorian type, in axis or off-axis, or it can be a more complex antenna optic, for example formed by one or more reflectors and sub-reflectors, or of any other type known per se, depending on the specific application.

The feed 1 is of the multimode type, and is configured to operate in one or more frequency bands of interest, in particular for radio frequency waves or microwaves.

The feed 1 finds application in the radar or aerospace field, for example in the satellite field, where a high tracking accuracy of an object is required. For example, the feed 1 may be used in an automatic antenna pointing system in ground stations for non-geostationary satellites, in particular for remote sensing satellites and satellites for meteorological applications. In addition, the feed 1 is also applied in ground stations used in launch and early orbit phase (LEOP) operations. In addition, the feed 1 can be used in wideband data link systems that operate in "Line of Site" mode towards surveillance systems, for example for coastal surveillance.

The feed 1 will be described below as receiving element of an electromagnetic wave 3 reflected by the reflector of a reflector antenna; however, it will be clear to the person skilled in the art that the feed 1 can also be used as a transmission element of an electromagnetic wave towards the reflector.

The propagation direction of the electromagnetic wave 3 depends on the position of an object, for example a satellite it is wished to track.

The feed 1 provides, starting from the electromagnetic wave 3, an azimuth error signal AZIMUTH_ERR and an elevation error signal EL_ERR, which indicate respectively the error in azimuth and the error in elevation of the pointing of the antenna itself with respect to the object.

In addition, the feed 1 also provides a sum signal SUM.

Such signals may be processed, in a per se known manner, to determine the position of the antenna with respect to the object to be tracked and thus to correct the position of the antenna itself.

The feed 1 comprises a receiving element 5 and a waveguide body or structure 8 coupled to the receiving element 5.

The receiving element 5 has an aperture or mouth 10 receiving the electromagnetic wave 3 and a hollow body 11 comprising a back portion 13 generating a plurality of transversal propagation modes starting from the electromagnetic wave 3.

The receiving element 5 generates, within the hollow body 11, a waveguide signal comprising a number of transversal propagation modes as a function of the dimension of the hollow body 11 itself. The intensity or amplitude of the transversal propagation modes depends on the mutual orientation between the direction of propagation of the electromagnetic wave 3 and the aperture 10.

In other words, the amplitude of the higher-order modes, in particular of the asymmetrical transversal modes, is a function of the mutual orientation between the wavefront of the electromagnetic wave 3 and the plane in which the aperture 10 lies.

In this embodiment, the receiving element 5 is a horn, in particular a corrugated horn.

The hollow body 11 has a conical shape extending along a longitudinal axis A between the aperture 10 and the back portion 13.

The diameter of the hollow body 11 decreases from the aperture 10 towards the back portion 13.

The back portion 13, cylindrical in shape, is dimensioned so as to support a fundamental mode $TE_{11}$, and at least four higher-order modes, herein modes $TM_{01}$, $TE_{21}$, $TE^*_{21}$ and $TE_{01}$.

The modes $TE_{21}$ and $TE^*_{21}$ are degenerate modes having different polarization, generated as a function of the orientation between the electromagnetic wave 3 and the aperture 10.

The waveguide body 8 comprises a main waveguide 14, coupled to the back portion 13 of the receiving element 5, in which the fundamental mode $TE_{11}$ propagates, and a plurality of mode couplers, one for each higher-order propagation mode that is intended to be used to obtain the azimuth and elevation error signals.

In this embodiment, the waveguide body 8 comprises a coupler $TE_{01}$ 15, a coupler $TE_{21}$ 16, a coupler $TE_{21}$* 17 and a coupler $TM_{01}$ 18.

The coupler $TE_{01}$ 15 provides, at an output port 19, a signal $S\_TE_{01}$ representative of the mode $TE_{01}$ generated in the receiving element 5. The coupler $TE_{21}$ 16 provides, at an output port 20, a signal $S\_TE_{21}$ representative of the mode $TE_{21}$ generated in the receiving element 5. The coupler $TE^*_{21}$ 17 provides, at an output port 21, a signal $S\_TE^*_{21}$ representative of the mode $TE^*_{21}$ generated in the receiving element 5. The coupler $TM_{01}$ 18 provides, at an output port 22, a signal $S\_TM_{01}$ representative of the mode $TM_{01}$ generated in the receiving element 5.

The waveguide body 8 further comprises an azimuth summing element 23, which generates the azimuth error signal by summing together the signal $S\_TE_{01}$ and the signal $S\_TE_{21}$, and an elevation summing element 24, which generates the elevation error signal by summing between them the signal $S\_TE_{21}$* and the signal $S\_TM_{01}$.

The couplers 15, 16, 17, 18 each comprise a respective main propagation portion (or main coupling line) 25, which supports propagation of the respective higher-order mode, a respective secondary propagation portion (or secondary coupling line) 26, and an extraction portion 27 which transfers or extracts the higher-order mode from the main propagation portion 25 to the secondary propagation portion 26.

In this embodiment, the main propagation portions 25 of the couplers 15, 16, 17 and 18 form portions of the main waveguide 14.

In detail, the main propagation portions 25 of the couplers 15, 16, 17, 18 extend in succession, from the back portion 13 of the receiving element 5, along the longitudinal axis A.

The main propagation portions 25 of the couplers 15-18 are each a waveguide portion having a circular cross-section, suitably dimensioned to support the propagation of the respective higher-order mode.

Figure 5:
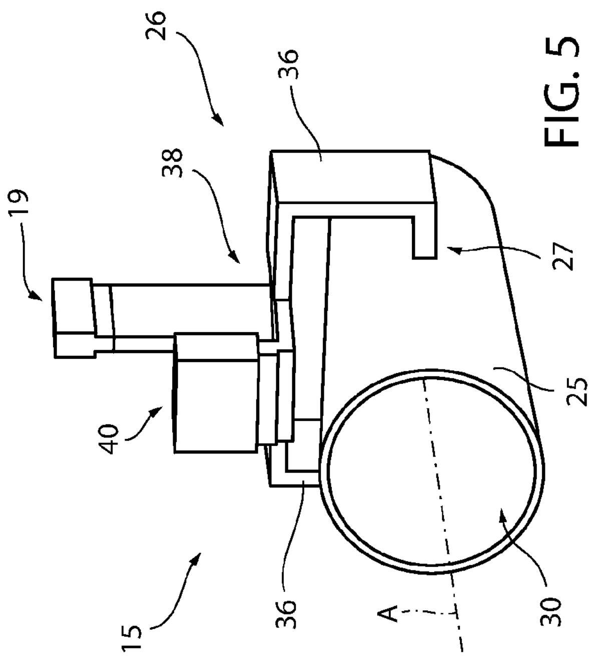
FIG. 5 shows a simplified perspective view of a first portion of the feed of FIG. 2.
Figure 6:
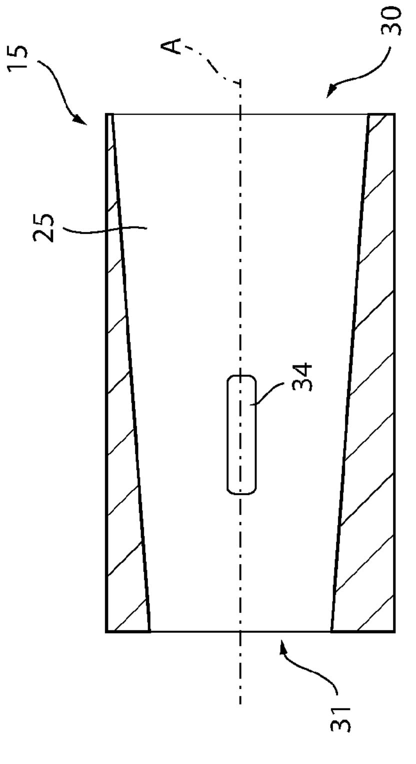
FIG. 6 shows a longitudinal section of the first portion of FIG. 5.

The coupler $TE_{01}$ 15 is shown in simplified form, for clarity's sake, in FIG. 5 in a perspective view and in FIG. 6 in a longitudinal section, along the longitudinal axis A.

The main propagation portion 25 of the coupler $TE_{01}$ 15 extends along the longitudinal axis A between a front section 30, coupled to the back portion 13 of the receiving element 5, and a back section 31, coupled to the main portion 25 of the coupler $TE_{21}$ 16.

The main propagation portion 25 of the coupler $TE_{01}$ 15 has a truncated cone shape, wherein the diameter of the front section 30 is greater than the diameter of the back section 31.

The dimension of the main propagation portion 25 of the coupler $TE_{01}$ 15 can be chosen as a function of the frequency range in which it is desired to operate the feed 1.

In detail, by considering a frequency of interest indicative of said desired frequency range, the diameter of the front section 30 is such as to obtain a cut-off frequency of the mode $TE_{01}$ lower than the frequency of interest, and the diameter of the back section 31 is such as to obtain a cut-off frequency of the mode $TE_{01}$ greater than the frequency of interest.

In practice, the back section 31 forms a short circuit for the mode $TE_{01}$. Thus, the mode $TE_{01}$ does not propagate further along the main waveguide 14.

For example, the diameter of the front section 30 may be comprised between 40 mm and 50 mm, and the diameter of the back section 31 may be comprised between 25 mm and 35 mm.

In addition, the main propagation portion 25 may have a length, along the longitudinal axis A, of about 100 mm.

The extraction portion 27 of the coupler $TE_{01}$ 15 is formed by two longitudinal slots 34 extending in the sidewall of the main propagation portion 25. The slots 34 have a main extension along the longitudinal axis A, for example may have a length along the longitudinal axis A of about a few centimetres.

The longitudinal slots 34 extend diametrically one with the other with respect to the longitudinal axis A, parallel to a median plane comprising the longitudinal axis A and an axis Y' (FIG. 7) transversal to the longitudinal axis A.

The secondary propagation portion 26 of the coupler $TE_{01}$ 15 is formed by two branches 36 each coupled to a respective longitudinal slot 34.

The branches 36 are waveguides with rectangular section.

The longitudinal slots 34 couple the mode $TE_{01}$ propagating in the main propagation portion 25 into the branches 36 of the secondary propagation portion 26.

The branches 36 can be designed to be single-mode waveguides, i.e., adapted to allow only the propagation of the fundamental mode $TE_{10}$ of the rectangular waveguides. In this way, the mode $TE_{01}$ can propagate in the branches 36 as the fundamental mode $TE_{10}$ of the branches 36.

The slots 34 and the branches 36 are dimensioned so that the mode $TE_{01}$ propagating in the main propagation portion 25 is fully coupled into the branches 36 of the secondary propagation portion 26, except for residual coupling losses.

However, the coupling efficiency between the main propagation portion 25 and the secondary propagation portion 26 may be chosen, at the design stage, depending on the specific application.

The coupler $TE_{01}$ 15 further comprises a sum junction, here a magic tee junction 38, forming the output port 19 of the coupler $TE_{01}$ 15. The magic tee junction 38 sums together the signals propagating in the branches 36 thereby forming the signal $S\_TE_{01}$ at the output port 19.

The signal $S\_TE_{01}$ is therefore indicative of the intensity of the mode $TE_{01}$ generated in the receiving element 5 and extracted from the main propagation portion 25 of the coupler $TE_{01}$ 15.

The magic tee junction 38 also comprises a difference port 40 providing a difference signal between the propagating signals in the branches 36; this signal is indicative of a portion of the fundamental mode $TE_{11}$ propagating in the main waveguide 14 and extracted from the longitudinal slots 34. The signal at the difference port 40 is of the spurious type and the difference port 40 may be suitably coupled to a load, depending on the specific application.

In this embodiment, the front section 30 of the main propagation portion 25 of the coupler $TE_{01}$ 15 is coupled to the back portion 13 of the receiving element 5 via a flange 41. The back section 31 of the main propagation portion 25 of the coupler $TE_{01}$ 15 is coupled to the main propagation portion 25 of the coupler $TE_{21}$ 16 via a flange 42.

Figure 4:
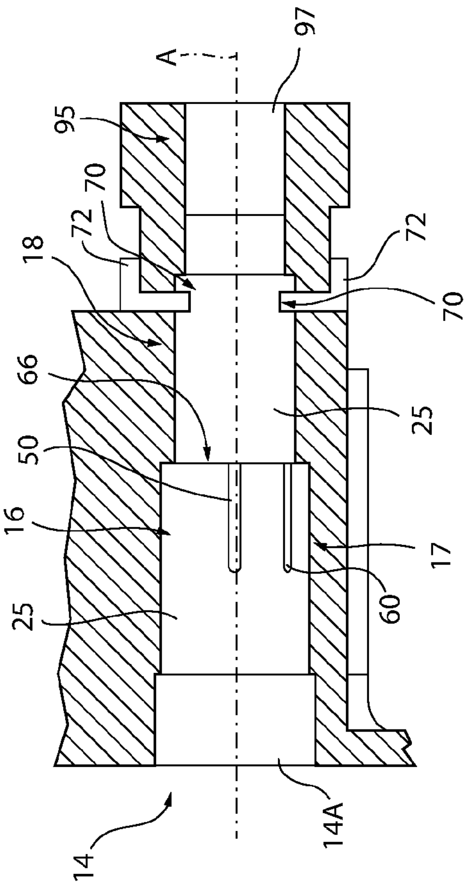
FIG. 4 shows a longitudinal section of a part of the feed of FIG. 2.

Again with reference to FIGS. 1-4, in this embodiment, the coupler $TE_{21}$ 16 and the coupler $TE^*_{21}$ 17 share a same main propagation portion 25 (FIG. 4) having a cylindrical shape about the longitudinal axis A.

The main waveguide 14 also comprises, in this embodiment, a coupling portion 14A, having a cylindrical section, extending between the end section 31 of the coupler $TE_{01}$ 15 and the main propagation portion 25 of the couplers $TE_{21}$ 16 and $TE^*_{21}$ 17.

The main propagation portion 25 of the couplers $TE_{21}$ 16 and $TE^*_{21}$ 17 has a diameter smaller than the coupling portion 14A.

Still with reference to the frequency of interest, the diameter of the main propagation portion 25 of the couplers $TE_{21}$ 16 and $TE^*_{21}$ 17 is such as to obtain a cut-off frequency of the modes $TE_{21}$ and $TE^*_{21}$ lower than the frequency of interest.

In practice, the main propagation portion 25 of the couplers $TE_{21}$ 16 and $TE^*_{21}$ 17 supports the propagation of the modes $TE_{21}$ and $TE^*_{21}$.

The coupler $TE_{21}$ and the coupler $TE^*_{21}$ 17 have extraction portions 27 distinct one from the other and secondary propagation portions 26 distinct one from the other.

The extraction portion 27 of the coupler $TE_{21}$ 16 is formed by two longitudinal slots 50 extending in the wall of the main propagation portion 25. The slots 50 have a main extension along the longitudinal axis A, for example they may have a length along the longitudinal axis A of few centimetres.

The longitudinal slots 50 extend diametrically the one with the other with respect to the longitudinal axis A.

Figure 8:
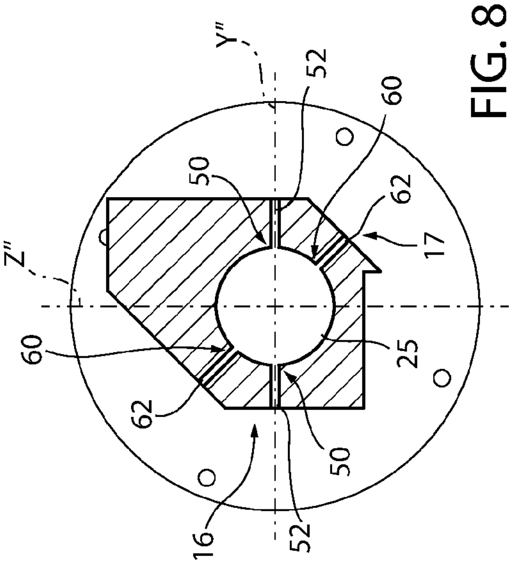
FIG. 8 shows a cross-section of a second portion of the feed of FIG. 2.

The slots 50 of the coupler $TE_{21}$ 16 extend parallel to the longitudinal axis A in the same median plane, comprising the longitudinal axis A and an axis Y" (FIGS. 8 and 9) parallel to the axis Y', of the slots 34 of the coupler $TE_{01}$ 15.

The secondary propagation portion 26 of the coupler $TE_{21}$ 16 has a general structure similar to that of the secondary propagation portion 26 of the coupler $TE_{01}$ 15.

In detail, the secondary propagation portion 26 of the coupler $TE_{21}$ 16 is also formed by two branches 52, which form waveguides with rectangular section, each coupled to a respective longitudinal slot 50.

The longitudinal slots 50 couple the mode $TE_{21}$, propagating in the main propagation portion 25, in the branches 52 of the secondary propagation portion 26.

The branches 52 can be designed to be single-mode waveguides, i.e., adapted to allow only the propagation of the fundamental mode $TE_{10}$ of the rectangular waveguides. In this way, the mode $TE_{21}$ can propagate in the branches 52 as the fundamental mode $TE_{10}$ of the rectangular waveguides.

The slots 50 and the branches 52 are dimensioned so that the mode $TE_{21}$ propagating in the main propagation portion 25 is fully coupled in the branches 52 of the secondary propagation portion 26, except for residual coupling losses.

However, the coupling efficiency between the main propagation portion 25 and the secondary propagation portion 26 may be chosen, at the design stage, depending on the specific application.

Also the coupler $TE_{21}$ 16 comprises a sum junction, here a magic tee junction 55, forming the output port 20 of the coupler $TE_{21}$ 16. The magic tee junction 55 sums together the signals propagating in the branches 52, thereby forming the signal $S\_TE_{21}$ at the output port 20.

The signal $S\_TE_{21}$ is therefore indicative of the intensity of the mode $TE_{21}$ generated in the receiving element 5 and extracted from the main propagation portion 25 of the coupler $TE_{21}$ 16.

The extraction portion 27 of the coupler $TE^*_{21}$ 17 is formed by two longitudinal slots 60 extending in the wall of the main propagation portion 25. The slots 60 have a main extension along the longitudinal axis A, for example they may have a length along the longitudinal axis A of few centimetres, in particular equal to the length of the longitudinal slots 34 and 50.

The longitudinal slots 60 extend diametrically the one with the other with respect to the longitudinal axis A.

The slots 60 of the coupler $TE^*_{21}$ 17 extend, parallel to the longitudinal axis A, in a plane rotated by about 45° about the longitudinal axis A with respect to the median plane on which the slots 34 of the coupler $TE_{01}$ 15 lie.

The secondary propagation portion 26 of the coupler $TE^*_{21}$ 17, although not shown in detail, has a general structure similar to that of the secondary propagation portion 26 of the coupler $TE_{01}$ 15.

In detail, the secondary propagation portion 26 of the coupler $TE^*_{21}$ 17 is also formed by two branches 62, which form waveguides with rectangular section, each coupled to a respective longitudinal slot 60.

The longitudinal slots 60 couple the mode $TE^*_{21}$, propagating in the main propagation portion 25, in the branches 62 of the secondary propagation portion 26.

The branches 62 can be designed to be single-mode waveguides, i.e., adapted to allow only the propagation of the fundamental mode $TE_{10}$ of the rectangular waveguides. In this way, the mode $TE^*_{21}$ can propagate in the branches 62 as the fundamental mode $TE_{10}$ of the rectangular waveguides.

The slots 60 and the branches 62 are dimensioned so that the mode $TE^*_{21}$ propagating in the main propagation portion 25 is fully coupled in the branches 62 of the secondary propagation portion 26, except for residual coupling losses.

However, the coupling efficiency between the main propagation portion 25 and the secondary propagation portion 26 may be chosen, at the design stage, depending on the specific application.

Also the coupler $TE^*_{21}$ 17 comprises a sum junction, here a magic tee junction 65, forming the output port 21 of the coupler $TE^*_{21}$ 17. The magic tee junction 65 sums together the signals propagating in the branches 62, thereby forming the signal $S\_TE^*_{21}$ at the output port 21.

The signal $S\_TE^*_{21}$ is therefore indicative of the intensity of the mode $TE^*_{21}$ generated in the receiving element 5 and extracted from the main propagation portion 25 of the coupler $TE^*_{21}$ 17.

With reference to the coupler $TM_{01}$ 18, the main propagation portion 25 has a coupling interface 66 with the main propagation portion 25 of the couplers $TE_{21}$ 16 and $TE^*_{21}$ 17 and has a cylindrical shape about the longitudinal axis A.

The main propagation portion 25 of the coupler $TM_{01}$ 18 has a diameter smaller than the main propagation portion 25 of the couplers $TE_{21}$ 16 and $TE^*_{21}$ 17.

Still with reference to the frequency of interest, the diameter of the main propagation portion 25 of the coupler $TM_{01}$ is such as to obtain a cut-off frequency of the mode $TM_{01}$ lower than the frequency of interest, and a cut-off frequency of the mode $TE_{21}$ and $TE^*_{21}$ greater than the frequency of interest.

In practice, the main propagation portion 25 of the coupler $TM_{01}$ 18 supports the propagation of the mode $TM_{01}$ and does not support the propagation of the modes $TE_{21}$ and $TE^*_{21}$.

Thus, the coupling interface 66 between the main propagation portion 25 of the couplers $TE_{21}$ 16 and $TE^*_{21}$ 17 and the main propagation portion 25 of the coupler $TM_{01}$ 18 forms a short circuit of the modes $TE_{21}$ and $TE^*_{21}$.

The extraction portion 27 of the coupler $TM_{01}$ 18 is formed by two transversal slots 70 extending in the wall of the main propagation portion 25. The slots 70 have a main extension parallel to an axis Y''' transversal to the longitudinal axis A, in particular perpendicular to the longitudinal axis A.

The transversal slots 70 extend diametrically the one with the other with respect to the longitudinal axis A.

In detail, the transversal slots 70 of the coupler $TM_{01}$ 18 have a main extension in a plane comprising axes Y''' and Z''' transversal to the longitudinal axis A, and are rotated by about 90°, about the longitudinal axis A, with respect to the longitudinal slots 34 of the coupler $TE_{01}$ 15.

The secondary propagation portion 26 of the coupler $TM_{01}$ 18 has a general structure similar to that of the secondary propagation portion 26 of the coupler $TE_{01}$ 15.

In detail, also the secondary propagation portion 26 of the coupler $TM_{01}$ 18 is formed by two branches 72, which form waveguides with rectangular section, each coupled to a respective transversal slot 70.

The transversal slots 70 couple the mode $TM_{01}$, propagating in the main propagation portion 25, in the branches 72 of the secondary propagation portion 26.

The branches 72 may be designed to be single-mode waveguides. In this way, the mode $TM_{01}$ can propagate in the branches 72 as the fundamental mode $TE_{10}$ of the rectangular waveguides.

The transversal slots 70 and the branches 72 are dimensioned so that the mode $TM_{01}$ propagating in the main propagation portion 25 is fully coupled in the branches 72 of the secondary propagation portion 26, except for residual coupling losses.

However, the coupling efficiency between the main propagation portion 25 and the secondary propagation portion 26 may be chosen, at the design stage, depending on the specific application.

Also the coupler $TM_{01}$ 18 comprises a sum junction, here a magic tee junction 75, forming the output port 22 of the coupler $TM_{01}$ 18. The magic tee junction 75 sums together the signals propagating in the branches 72, thereby forming the signal $S\_TM_{01}$ at the output port 22.

The signal $S\_TM_{01}$ is therefore indicative of the intensity of the mode $TM_{01}$ generated in the receiving element 5 and extracted from the main propagation portion 25 of the coupler $TM_{01}$ 18.

The azimuth summing element 23 is a junction, here a magic tee junction, having a first input port coupled to the output port 19 of the coupler $TE_{01}$ 15, and therefore denoted by the same reference number, a second input port coupled to the output port 20 of the coupler $TE_{21}$ 16, and therefore denoted by the same reference number, and an output port 80.

The azimuth summing element 23 comprises a first arm 81A forming at a first end the first input port 19, a second arm 81B forming at a first end the second input port 20, and a third arm 81C forming at a first end the output port 80.

The first, second and third arms 81A, 81B, 81C are joined to the respective second ends.

The azimuth summing element 23 provides, at the output port 80, a signal given by the sum of the signal $S\_TE_{01}$ and of the signal $S\_TE_{21}$; this sum signal forms the azimuth error signal AZ_ERR.

In detail, the signal $S\_TE_{01}$, by propagating in the first arm 81A, acquires a first phase and the signal $S\_TE_{21}$, by propagating in the second arm 81B, acquires a second phase.

The first and second arms 81A, 81B are dimensioned so that the respective signals $S\_TE_{01}$ and $S\_TE_{21}$ are summed in phase in the output arm 81C, throughout the frequency range of interest.

The elevation summing element 24 is a junction, here a magic tee junction, having a first input port coupled to the output port 21 of the coupler $TE^*_{21}$ 17, and therefore denoted by the same reference number, a second input port coupled to the output port 22 of the coupler $TM_{01}$ 18, and therefore denoted by the same reference number, and an output port 90.

The elevation summing element 24 comprises a first arm 91A forming at a first end the first input port 21, a second arm 91B forming at a first end the second input port 22, and a third arm 91C forming at a first end the output port 90.

The first, second and third arms 91A, 91B, 91C are joined to the respective second ends.

The elevation summing element 24 provides, at the output port 90, a signal given by the sum of the signal $S\_TE^*_{21}$ and of the signal $S\_TM_{01}$; this sum signal forms the elevation error signal EL_ERR.

In detail, the signal $S\_TE^*_{21}$, by propagating in the first arm 91A, acquires a first phase and the signal $S\_TM_{01}$, by propagating in the second arm 91B, acquires a second phase.

The first and second arms 91A, 91B are dimensioned so that the respective signals $S\_TE^*_{21}$ and $S\_TM_{01}$ are summed in phase in the output arm 91C, throughout the frequency range of interest.

The azimuth and elevation summing element 23, 24 may also have a further difference output port, here not used and thus not described in detail, depending on the specific application, which may be suitably coupled to a load 92.

The waveguide body 8 further comprises a fundamental mode coupler 95, for example an orthomode transducer (OMT), having an output port 96. The fundamental mode coupler 95 provides, at the output port 96, the signal SUM, indicative of the fundamental mode $TE_{11}$ generated in the receiving element 5.

The fundamental mode coupler 95 comprises a main propagation portion 97, coupled to the main propagation portion 25 of the coupler $TM_{01}$ 18, and a secondary propagation portion 98, forming the output port 96.

The main propagation portion 97 is a waveguide with circular section, having a diameter such as to support, in the range of frequencies of interest, only the fundamental mode $TE_{11}$. For example, the main propagation portion 97 may have a diameter of about 20 mm.

In practice, the main propagation portion 97 of the fundamental mode coupler 95 is a short circuit for the mode $TM_{01}$.

The secondary propagation portion 98 is a waveguide with rectangular section, suitably coupled to the main propagation portion 97 so as to extract the fundamental mode $TE_{11}$ thereof, for example through one or more slots or otherwise coupled in a per se known manner.

In use, the amplitude of the higher-order modes $TE_{01}$, $TE_{21}$, $TE^*_{21}$ and $TM_{01}$ depends on the mutual orientation between the wavefront of the electromagnetic wave 3 and the aperture 10 of the receiving element 5.

In detail, the amplitude of the higher-order modes is zero if the wavefront is parallel to the aperture 10. In practice, in a monopulse tracking system, the amplitude of the higher-order modes is zero if the antenna is pointed exactly in the direction of the object to be tracked.

The excitation of the mode $TE_{01}$ depends on the polarization of the electric field of the incident electromagnetic wave 3 and on the angular deviation of the wavefront from the longitudinal axis A.

Considering for example that the electromagnetic wave 3 is vertically polarized, if the wave 3 arrives at the aperture 10 forming a non-zero angle of incidence on a horizontal plane of the feed 1, then both the mode $TE_{01}$ and the mode $TE_{21}$ are generated within the receiving element 5. For example, with reference to the arrangement of FIGS. 7-9, the modes $TE_{01}$ and $TE_{21}$ are generated if the wave 3, polarized parallel to the axes Y', Y", forms a non-zero angle of incidence with a plane comprising the axes Z' and A.

Figure 7:
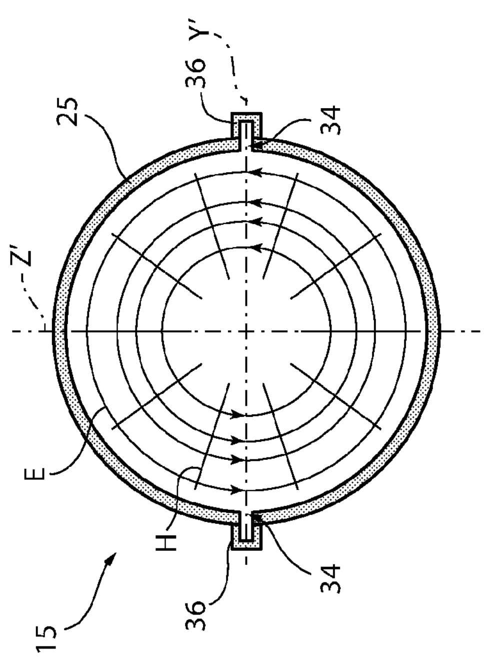
FIG. 7 shows a cross-section of the first portion of FIG. 5, in use, wherein the field lines of a higher-order propagation mode are shown.

In this case, the mode $TE_{01}$ propagates in the main propagation portion 25 of the coupler $TE_{01}$ 15 as far as the respective end section 31, which represents a short circuit of the mode $TE_{01}$. In the section of FIG. 7 both the electric field lines (circular arrows E) and the magnetic field lines (radial lines H) are shown.

In a cylindrical waveguide, the mode $TE_{01}$ has a cut-off frequency equal to that of the mode $TM_1$; therefore, in the back portion 13 of the receiving element 5, the mode $TM_1$ could also be generated, in addition to the mode $TE_{01}$. The Applicant has verified that the truncated cone shape of the main propagation portion 25 of the coupler $TE_{01}$ 15 allows to minimize the propagation of the higher-order mode $TM_{11}$ in the main propagation portion 25 of the coupler $TE_{01}$ 15.

Thus, the coupler $TE_{01}$ 15 allows to extract, in the first approximation, only the mode $TE_{01}$ through the longitudinal slots 34.

Figure 9:
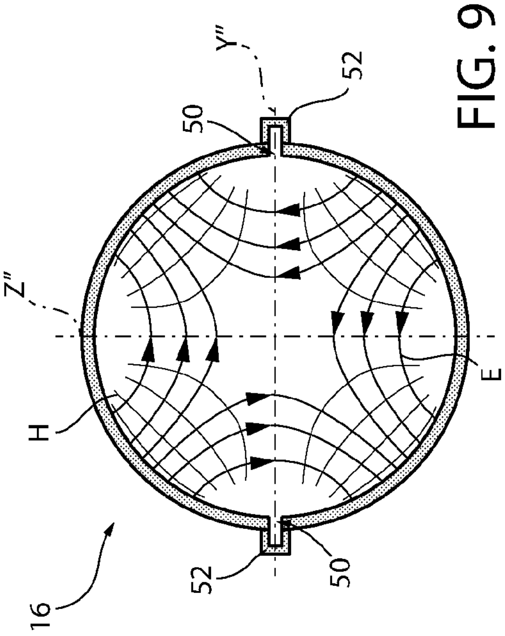
FIG. 9 shows a cross-section of the second portion of the feed of FIG. 2, in use, wherein the field lines of a different higher-order propagation mode are shown.

The mode $TE_{21}$ propagates, from the back portion 13 of the receiving element 5, through the main waveguide 14 in the main propagation portion 25 of the coupler $TE_{01}$ 15 and of the couplers $TE_{21}$ and $TE^*_{21}$ 16, 17. The propagation portion 25 of the coupler $TM_{01}$ 18 forms a short circuit of the mode $TE_{21}$. FIG. 9 shows the electric field lines (arrows E) and the magnetic field lines (lines H) of the mode $TE_{21}$.

The longitudinal slots 50 allow to extract the mode $TE_{21}$.

Furthermore, as discussed above, the modes $TE_{01}$ and $TE_{21}$ thus extracted are summed by the azimuth summing element 23, forming the azimuth error signal AZ_ERR.

If the electromagnetic wave 3 is vertically polarized and forms, at the aperture 10, a non-zero angle of incidence on an elevation plane of the feed 1, then in the receiving element 5 both the mode $TE^*_{21}$ and the mode $TM_{01}$ are generated.

Figure 11:
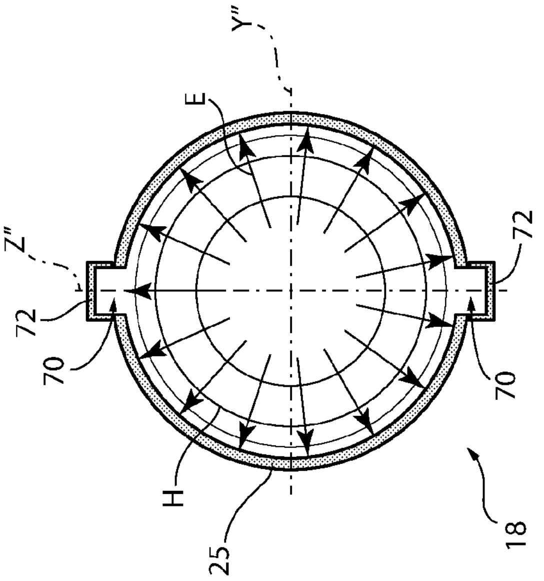
FIG. 11 shows a cross-section of a third portion of the feed of FIG. 2, in use, wherein the field lines of a further higher-order propagation mode are shown.
Figure 10:
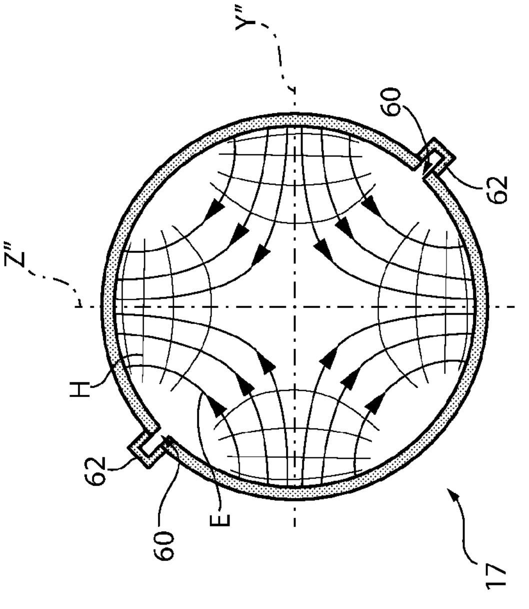
FIG. 10 shows a cross-section of the second portion of the feed of FIG. 2, in use, wherein the field lines of a further higher-order propagation mode are shown.

For example, with reference to the arrangement of FIGS. 10 and 11, the modes $TE^*_{21}$ and $TM_{01}$ are generated if the wave 3, polarized parallel to the axes Y'', Y''', forms a non-zero angle of incidence with a plane comprising the axes Y', Y'' and A.

The mode $TE^*_{21}$ propagates similarly to what has been discussed for the mode $TE_{21}$. However, the mode $TE^*_{21}$ has a polarization rotated by 45° with respect to the mode $TE_{21}$, as shown by the field lines of FIG. 10.

The mode $TM_0$ propagates in the main waveguide 14 from the back portion 13 of the receiving element 5 as far as the main propagation portion 25 of the coupler $TM_{01}$ 18; the fundamental mode coupler 95 in fact represents a short circuit for the mode $TM_{01}$. FIG. 11 shows the electric field lines (radial arrows E) and the magnetic field lines (circular lines H) of the mode $TM_0$ within the main propagation portion 25 of the coupler $TM_{01}$ 18. The fact that the slots 70 of the coupler $TM_{01}$ 18 are transversal, ensures that the coupling between the main propagation portion 25 and the secondary propagation portion 26 is of the magnetic type, since the electric field lines have a radial direction.

As discussed above, the modes $TE^*_{21}$ and $TM_{01}$ extracted from the longitudinal slots 60 and, respectively, from the transversal slots 70 are summed by the elevation summing element 24 and form the elevation error signal EL_ERR.

When the feed 1 is incorporated into an antenna of a radar tracking system, the azimuth and elevation error signals and the sum signal may be acquired, for example by means of special sensors or transducers, and processed, in a per se known manner, to obtain an estimate of the pointing error of the antenna with respect to the object to be tracked.

The fact that the azimuth and elevation error signals are each generated as the sum of two higher-order modes, in particular a phase sum of the respective modes, makes it possible to obtain a more accurate error signal.

In addition, the fact that the extraction portions 27 of the couplers 15-18 are slots, also allows to extract the wave portion that is reflected by the respective short-circuit sections along the main waveguide 14. Hence, the extraction through slots allows to maximize the extraction efficiency of the higher-order modes and further improve the performance of the feed 1, throughout the frequency range of interest.

In practice, the feed 1 allows to increase the maximum level of the azimuth and elevation error signals and therefore to obtain high performance in tracking an object, when incorporated into a monopulse tracking system.

Thanks to the high precision with which the error signals can be obtained, the feed 1 can keep small dimensions, for example compared to known feeds. This is particularly relevant when the feed 1 is coupled to an antenna optic comprising more than one reflector, for example a small sub-reflector. In this case, in fact, the feed 1 allows an optimal illumination of the sub-reflector, while maintaining the high performance of the antenna.

Consequently, the feed of the present invention can be used to keep the production costs and the dimensions of a reflector antenna low, while ensuring high performance.

Finally, it is evident that modifications and variations can be made to the feed described and illustrated herein, without departing from the scope of the present invention, as defined by the appended claims.

For example, the couplers 15-18 may have a different number of slots than shown, for example a slot or a number of slots greater than two, preferably in even number.

For example, the receiving element 5 and the main waveguide 14 may be waveguides with non-circular section, for example rectangular or other shape. In this case, the four higher-order modes used to generate the azimuth and elevation error signals may be modes different from the modes $TE_{01}$, $TE_{21}$, $TE^*_{21}$, and $TM_{01}$.

The invention claimed is:

1. A multimode feed for a reflector antenna of a monopulse tracking system, the multimode feed comprising:

a receiving element having an aperture, configured to receive an electromagnetic wave and to generate, from the electromagnetic wave, a waveguide signal comprising a plurality of higher-order modes as a function of an incidence angle of the electromagnetic wave on the aperture; and a waveguide structure coupled to the receiving element and having a first output port and a second output port, the waveguide structure being configured to generate, from the plurality of higher-order modes, a first tracking error signal at the first output port and a second tracking error signal at the second output port, wherein the waveguide structure comprises:

a first coupler configured to extract, from the waveguide signal, a first higher-order mode of the plurality of higher-order modes and to provide a first extracted signal;

a second coupler configured to extract, from the waveguide signal, a second higher-order mode of the plurality of higher-order modes and to provide a second extracted signal;

a third coupler configured to extract, from the waveguide signal, a third higher-order mode of the plurality of higher-order modes and to provide a third extracted signal;

a fourth coupler configured to extract, from the waveguide signal, a fourth higher-order mode of the plurality of higher-order modes and to provide a fourth extracted signal;

a first summing element forming the first output port and configured to sum the first extracted signal and the second extracted signal, thereby generating the first error tracking signal; and a second summing element forming the second output port and configured to sum the third extracted signal and the fourth extracted signal, thereby generating the second error tracking signal, wherein the first, the second, the third and the fourth couplers each comprise a main coupling line, the waveguide structure having a main waveguide configured for propagating the waveguide signal, the main waveguide comprising a first portion, a second portion and a third portion extending along a longitudinal axis, in succession, from the receiving element, wherein the first portion forms the main coupling line of the first coupler, the second portion forms the main coupling line of the second and the third couplers, and the third portion forms the main coupling line of the fourth coupler, wherein the first portion of the main waveguide supports the propagation of the first higher-order mode and the second portion of the main waveguide does not support the propagation of the first higher-order mode, and wherein the main coupling line of the first coupler has a circular cross-section and extends along the longitudinal axis between a front section having a first diameter and a back section having a second diameter smaller than the first diameter, the second diameter being smaller than the diameter associated with a cut-off frequency of the first higher-order mode, wherein the first, the second, the third and the fourth couplers each further comprise a respective secondary coupling line and a respective extraction portion configured to extract a mode propagating in the respective main coupling line into the respective secondary coupling line, the extraction portion being formed by at least one slot extending in a sidewall of the main coupling line, wherein the at least one slot of the first coupler, the at least one slot of the second coupler and the at least one slot of the third coupler are longitudinal slots extending along a direction parallel to the longitudinal axis, the at least one slot of the fourth coupler being a transversal slot extending along an axis transversal to the longitudinal axis.

2. The multimode feed according to claim 1, wherein the second portion of the main waveguide supports the propagation of the second higher-order mode and the third portion of the main waveguide does not support the propagation of the second higher-order mode.

3. The multimode feed according to claim 1, wherein the longitudinal slot of the second coupler extends along an axis, the longitudinal slot of the third coupler extends along an axis rotated by 45° about the longitudinal axis with respect to the axis of the longitudinal slot of the second coupler.

4. The multimode feed according to claim 1, wherein the secondary coupling lines of the first, the second, the third and the fourth couplers are waveguides having a rectangular cross-section.

5. The multimode feed according to claim 1, wherein the receiving element and the main waveguide have a circular cross-section.

6. The multimode feed according to claim 1, wherein the first higher-order mode is a $TE_{01}$ mode, the second higher-order mode is a $TE_{21}$ mode, the third higher-order mode is a $TE^*_{21}$ mode and the fourth higher-order mode is a $TM_{01}$ mode, the second and the third higher-order modes being degenerate modes having different polarizations one with the other.

7. The multimode feed according to claim 1, wherein the first summing element is configured to provide a first phase to the first extracted signal and a second phase to the second extracted signal, so that the first summing element sums, in phase, the first extracted signal and the second extracted signal, and/or wherein the second summing element is configured to provide a third phase to the third extracted signal and a fourth phase to the fourth extracted signal, so that the second summing element sums, in phase, the third extracted signal and the fourth extracted signal.

8. A reflector antenna for a monopulse tracking system, comprising the multimode feed according to claim 1.

9. A multimode feed for a reflector antenna of a monopulse tracking system, the multimode feed comprising:

a receiving element having an aperture, configured to receive an electromagnetic wave and to generate, from the electromagnetic wave, a waveguide signal comprising a plurality of higher-order modes as a function of an incidence angle of the electromagnetic wave on the aperture; and a waveguide structure coupled to the receiving element and having a first output port and a second output port, the waveguide structure being configured to generate, from the plurality of higher-order modes, a first tracking error signal at the first output port and a second tracking error signal at the second output port, wherein the waveguide structure comprises:

a first coupler configured to extract, from the waveguide signal, a first higher-order mode of the plurality of higher-order modes and to provide a first extracted signal;

a second coupler configured to extract, from the waveguide signal, a second higher-order mode of the plurality of higher-order modes and to provide a second extracted signal;

a third coupler configured to extract, from the waveguide signal, a third higher-order mode of the plurality of higher-order modes and to provide a third extracted signal;

a fourth coupler configured to extract, from the waveguide signal, a fourth higher-order mode of the plurality of higher-order modes and to provide a fourth extracted signal;

a first summing element forming the first output port and configured to sum the first extracted signal and the second extracted signal, thereby generating the first error tracking signal; and a second summing element forming the second output port and configured to sum the third extracted signal and the fourth extracted signal, thereby generating the second error tracking signal, wherein the first, the second, the third and the fourth couplers each comprise a main coupling line, the waveguide structure having a main waveguide configured for propagating the waveguide signal, the main waveguide comprising a first portion, a second portion and a third portion extending along a longitudinal axis, in succession, from the receiving element, wherein the first portion forms the main coupling line of the first coupler, the second portion forms the main coupling line of the second and the third couplers, and the third portion forms the main coupling line of the fourth coupler, wherein the first portion of the main waveguide supports the propagation of the first higher-order mode and the second portion of the main waveguide does not support the propagation of the first higher-order mode, and wherein the main coupling line of the first coupler has a circular cross-section and extends along the longitudinal axis between a front section having a first diameter and a back section having a second diameter smaller than the first diameter, the second diameter being smaller than the diameter associated with a cut-off frequency of the first higher-order mode, wherein the first higher-order mode is a $TE_{01}$ mode, the second higher-order mode is a $TE_{21}$ mode, the third higher-order mode is a $TE^*_{21}$ mode and the fourth higher-order mode is a $TM_{01}$ mode, the second and the third higher-order modes being degenerate modes having different polarizations one with the other.

* * * * *